(12) United States Patent
Hung et al.

(10) Patent No.: US 10,177,412 B2
(45) Date of Patent: Jan. 8, 2019

(54) ELECTROLYTE COMPOSITION, AND SODIUM SECONDARY BATTERY EMPLOYING THE SAME

(71) Applicant: Industrial Technology Research Institute, Hsinchu (TW)

(72) Inventors: Tai-Feng Hung, Taipei (TW); Yu-Wen Yeh, Xinfeng Township (TW); Wen-Sheng Chang, Pingtung (TW); Chang-Chung Yang, Taipei (TW); Che-Wei Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 248 days.

(21) Appl. No.: 14/950,910

(22) Filed: Nov. 24, 2015

(65) Prior Publication Data

US 2017/0054177 A1  Feb. 23, 2017

(30) Foreign Application Priority Data

Aug. 21, 2015 (TW) ............... 104127289 A

(51) Int. Cl.
| | |
|---|---|
| *H01M 10/0568* | (2010.01) |
| *H01M 10/054* | (2010.01) |
| *H01M 4/58* | (2010.01) |
| *H01M 4/485* | (2010.01) |
| *H01M 4/505* | (2010.01) |
| *H01M 10/0569* | (2010.01) |
| *H01M 2/16* | (2006.01) |

(52) U.S. Cl.
CPC ....... *H01M 10/0568* (2013.01); *H01M 4/485* (2013.01); *H01M 4/505* (2013.01); *H01M 4/5825* (2013.01); *H01M 10/054* (2013.01); *H01M 10/0569* (2013.01); *H01M 2/1613* (2013.01); *H01M 2/1626* (2013.01); *H01M 2/1653* (2013.01); *H01M 2300/0028* (2013.01)

(58) Field of Classification Search
CPC ......... H01M 10/0568; H01M 10/0569; H01M 10/054; H01M 4/505; H01M 4/485; H01M 4/5825; H01M 2/1613; H01M 2/1626; H01M 2/1653; H01M 2300/0028
See application file for complete search history.

(56) References Cited

U.S. PATENT DOCUMENTS

| | | | |
|---|---|---|---|
| 4,427,267 A * | 1/1984 | Collins ............ | G02F 1/15 252/408.1 |
| 5,037,713 A | 8/1991 | Yoshino et al. | |
| 5,051,325 A | 9/1991 | Shishikura et al. | |
| 5,567,300 A * | 10/1996 | Datta ............ | B23H 3/08 204/225 |
| 5,968,681 A | 10/1999 | Miura et al. | |
| 6,162,563 A | 12/2000 | Miura et al. | |
| 6,180,287 B1 | 1/2001 | Watanabe et al. | |
| 6,402,918 B1 * | 6/2002 | Schlenoff ......... | G01N 27/44752 204/600 |
| 7,763,768 B2 | 7/2010 | Al Nashef et al. | |
| 7,812,211 B2 | 10/2010 | Al Nashef et al. | |
| 8,022,014 B2 | 9/2011 | Miller | |
| 8,247,198 B2 | 8/2012 | Gorke et al. | |
| 8,303,845 B2 | 11/2012 | Wang et al. | |
| 8,349,141 B2 | 1/2013 | Chang et al. | |
| 8,361,661 B2 | 1/2013 | Doe et al. | |
| 8,420,881 B2 | 4/2013 | Al Nashef et al. | |
| 8,568,570 B2 | 10/2013 | Chang et al. | |
| 8,815,222 B2 | 8/2014 | Pan et al. | |
| 2011/0003192 A1 | 1/2011 | Kuze et al. | |
| 2012/0058393 A1 | 3/2012 | Fukunaga et al. | |
| 2012/0235644 A1 * | 9/2012 | Gordon ............ | H01M 10/36 29/623.1 |
| 2013/0052525 A1 | 2/2013 | Kageura et al. | |
| 2013/0115521 A1 | 5/2013 | Doe et al. | |
| 2013/0202955 A1 | 8/2013 | Yawata et al. | |
| 2014/0208753 A1 | 7/2014 | Liu et al. | |
| 2014/0275305 A1 | 9/2014 | Svenson et al. | |
| 2014/0341934 A1 | 11/2014 | van Spronsen et al. | |
| 2015/0064574 A1 | 3/2015 | He et al. | |
| 2017/0125789 A1 * | 5/2017 | Labyedh ......... | H01M 10/0525 |

FOREIGN PATENT DOCUMENTS

| | | |
|---|---|---|
| CN | 101297434 A | 10/2008 |
| CN | 101935849 A | 1/2011 |
| CN | 102229439 A | 11/2011 |

(Continued)

OTHER PUBLICATIONS

Boisset et al., "Physical properties of a new Deep Eutectic Solvent based on lithium bis [(trifluoromethyl) sulfonyl] imide and N-nethylacetamide as superionic suitable electrolyte for lithium ion batteries and electric double layer capacitors", Electrochimica Acta 102, 2013, pp. 120-126.

Fukunaga et al., "Intermediate-temperature ionic liquid NaFSA-KFSA and its application to sodium secondary batteries", Journal of Power Sources 209, 2012, pp. 52-56.

Hu et al., "Novel room temperature molten salt electrolyte based on LiTFSI and acetamide for lithium batteries", Electrochemistry Communications 6, 2004, pp. 28-32.

Zaidi et al., "Deep Eutectic Solvents Based on N-Mehtylacetamide and a Lithium Salt as Electrolytes at Elevated Temperature for Activated Carbon-Based Supercapacitors", The Journal of Physical Chemistry C, 2014, vol. 118, pp. 4033-4042.

(Continued)

*Primary Examiner* — Laura Weiner

(74) *Attorney, Agent, or Firm* — Birch, Stewart, Kolasch & Birch, LLP

(57) ABSTRACT

An electrolyte composition and a sodium secondary battery are provided. The electrolyte composition includes an alcohol compound and a metallic salt, wherein the metallic salt consists of a sodium salt formed. The sodium secondary battery includes the electrolyte composition, a positive electrode, a negative electrode, and a separator disposed between the positive electrode and the negative electrode.

10 Claims, 3 Drawing Sheets

(56) References Cited

FOREIGN PATENT DOCUMENTS

| CN | 102405549 A | 4/2012 |
|---|---|---|
| CN | 102511108 A | 6/2012 |
| CN | 102780033 A | 11/2012 |
| CN | 103994356 A | 7/2014 |
| CN | 104233361 A | 12/2014 |
| KR | 10-1425810 B1 | 8/2014 |
| TW | 201108494 A1 | 3/2011 |
| WO | WO 2013/122409 A1 | 8/2013 |

OTHER PUBLICATIONS

Zaidi et al., "Deep eutectic solvent based on sodium cations as an electrolyte for supercapacitor application", RSC Advances, 2014, vol. 4, pp. 45647-45652.
Taiwanese Office Action for Application No. 104127289, dated Mar. 15, 2016.

\* cited by examiner

ELECTROLYTE COMPOSITION, AND SODIUM SECONDARY BATTERY EMPLOYING THE SAME

CROSS REFERENCE TO RELATED APPLICATIONS

The application is based on, and claims priority from, Taiwan Application Serial Number 104127289, filed on Aug. 21, 2015, the disclosure of which is hereby incorporated by reference herein in its entirety.

TECHNICAL FIELD

The technical field relates to an electrolyte composition, and a sodium secondary battery employing the electrolyte composition.

BACKGROUND

With rapid economic development, mankind is facing critical problems, including the depletion of petrochemical resources and pollution caused by non-renewable energy resources such as gasoline and coal. It is imperative to find other sources of energy that have the advantages of high energy density, environmental friendliness, and sustainable development.

In order to solve this problem, many attempts to use a sodium resource, which is sufficiently present on earth, as a material in a secondary battery have been conducted. The sodium secondary battery shows a higher charge capacity and a higher discharge capacity, and has a longer cycle life.

According to the polarity of the solvent used in the electrolyte, the sodium secondary battery can be classified into two groups, i.e., aqueous electrolyte sodium secondary battery and non-aqueous electrolyte sodium secondary battery. Although the electrolyte sodium secondary battery has the advantages of having a low cost and being safe, but the aqueous electrolyte sodium secondary battery has a low applicability due to the low energy density.

In comparison with the conventional ionic liquid, the deep eutectic solvent has advantages of easier preparation, availability of raw materials, and high biocompatibility. Recently, research into electrochemical energy storage systems having a deep eutectic solvent have been increasing. It is important to develop the new electrolyte with a low cost, high cycle stability, wide operating potential, and ion conductivity similar to a conventional non-aqueous electrolyte for sodium secondary battery. Accordingly, there is a need to develop an electrolyte used in the sodium secondary battery for increasing the charging/discharging efficiency and capacity of the sodium secondary battery.

SUMMARY

An embodiment of the disclosure provides an electrolyte composition including an alcohol compound; and a metallic salt, wherein the metallic salt consists of a sodium salt.

According to another embodiment of the disclosure, a sodium secondary battery is provided. The sodium secondary battery includes a negative electrode; a positive electrode; a separator disposed between the positive electrode and the negative electrode; and the aforementioned electrolyte composition.

A detailed description is given in the following embodiments with reference to the accompanying drawings.

BRIEF DESCRIPTION OF THE DRAWINGS

The disclosure can be more fully understood by reading the subsequent description and examples with references made to the accompanying drawings, wherein.

DETAILED DESCRIPTION

Figure 1:
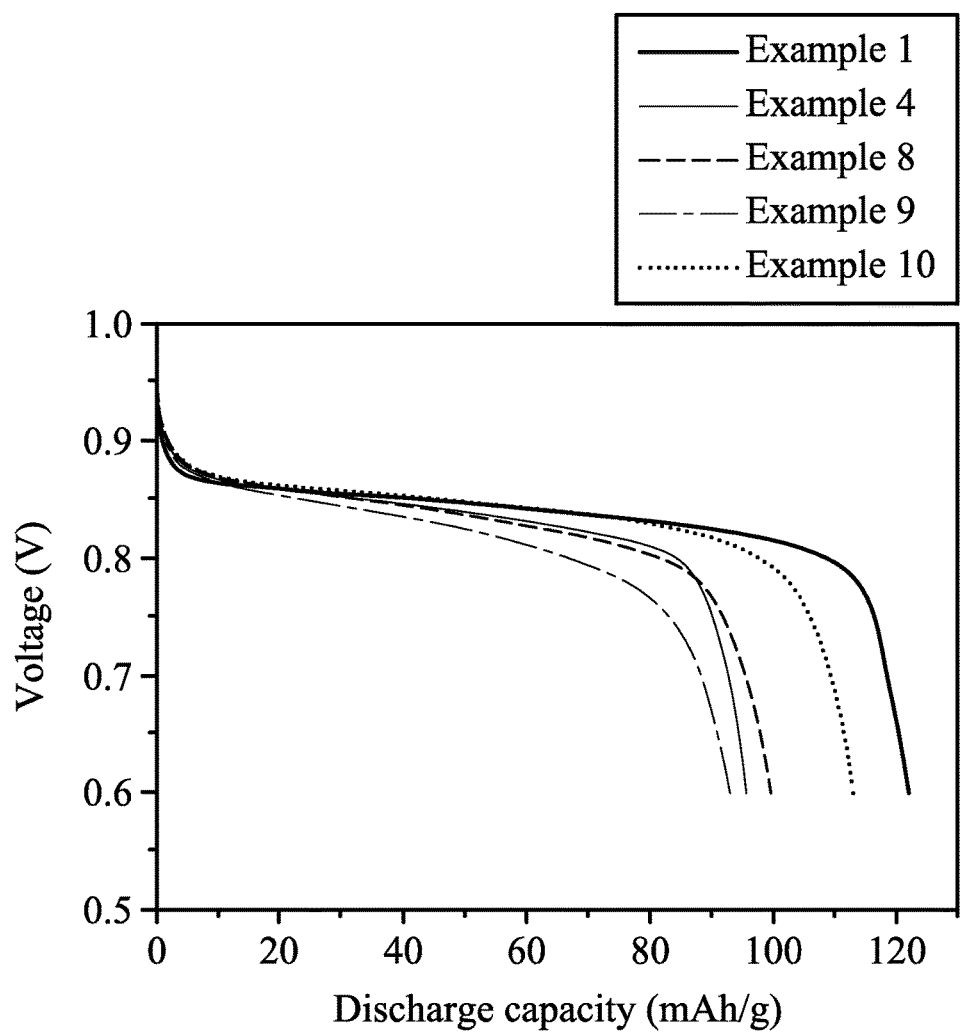
FIG. 1 shows the discharge curves of the batteries employing the electrolyte composition of Examples of the disclosure measured at 100 mA/g.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to solve the problem of low stability of the battery and protect the battery from corrosion by hydrofluoric acid which is produced by halide anions (such as $PF_6^-$) in the electrolyte of the sodium secondary battery reacting with water, the disclosure provides an electrolyte composition with high cycle stability including an alcohol compound serving as a hydrogen bond donor and a metallic salt.

According to embodiments of the disclosure, the disclosure provides an electrolyte composition including an alcohol compound; and a metallic salt, wherein the metallic salt consists of a sodium salt.

In an embodiment of the disclosure, the alcohol compound can include mono-alcohol, diol, triol, or a combination thereof. According to the embodiments of the the mono-alcohol can include ethanol. According to the embodiments of the disclosure, the diol can include diethylene glycol, triethylene glycol, tetraethylene glycol, ethylene glycol, 1,3-propanediol, 1,4-butanediol, 1,5-pentanediol, or a combination thereof. According to the embodiments of the disclosure, the diol can be a compound having 2-4 carbon atoms, wherein the number of carbon atoms of the diol may alter the viscosity and vapor pressure of the electrolyte employing the diol. When the number of carbon atoms of the diol is too low, the electrolyte employing the diol would have a higher vapor pressure. When the number of carbon atoms of the diol is too high, the electrolyte employing the diol would have higher viscosity, resulting in the reducing the ion-transportation efficiency of the electrolyte. The solvent with the low vapor pressure is not apt to be volatile and then the concentration of the electrolyte composition would not be increased, resulting in improving the cycle stability of the battery. According to the embodiments of the disclosure, the triol can include glycerol.

According to the embodiments of the disclosure, the sodium salt can include $NaPF_6$, $NaBF_4$, $NaClO_4$, $NaBr$, $NaCl$, or a combination thereof.

According to the embodiments of the disclosure, the sodium salt can include $NaHCO_3$, $NaNO_3$, $CH_3COONa$, $C_6H_4(OH)COONa$, or a combination thereof. According to embodiments of the disclosure, the sodium salt can be a halogen-free sodium salt. When the sodium salt is $NaHCO_3$, $NaNO_3$, $CH_3COONa$, $C_6H_4(OH)COONa$, or a combination thereof, there is no halogen-containing acid compound formed in the electrolyte composition during the operation of the battery, resulting in improving the cyclability of the battery.

According to the embodiments of the disclosure, wherein the molar ratio of the alcohol compound to the sodium salt is between 3:1 and 48:1. When the molar ratio is lower than 3:1, the electrolyte composition is a non-clear liquid and the battery the electrolyte composition exhibits an inferior efficiency. When the molar ratio is higher than 48:1, in spite of the electrolyte composition is a deep eutectic solvent, it exhibits an inferior ion-transportation efficiency due to the low concentration of the sodium salt, thereby reducing the efficiency of the battery employing the electrolyte composition.

According to another embodiment of the disclosure, the disclosure provides a sodium secondary battery including a negative electrode; a positive electrode; a separator disposed between the positive electrode and the negative electrode; and the aforementioned electrolyte composition. According to the embodiments of the disclosure, wherein the positive electrode can include sodium-containing oxide ($Na_xMO_2$, M=Fe, Mn, Co, Ni, or a combination thereof, $0<x\leq1$), sodium-containing ferrocyanide ($Na_2MxFe(CN)_6$, M=Fe, Co, Ni, Cu, Zn, Mn, or a combination thereof, $0<x\leq1$), sodium phosphate ($Na_3M_2(PO_4)_3$, M is Al or V). According to the embodiments of the disclosure, wherein the negative electrode can include metal oxide ($M_xO_y$, M=Fe, Mn, Co, Ni, Cu, Zn, $0<x\leq3$, $1\leq y\leq4$), sodium phosphate ($Na_xM_y(PO_4)_3$, M=Fe, Ti, Mg, Al, V, or a combination thereof, $1\leq x\leq3$, $1\leq y\leq3$).

According to the embodiments of the disclosure, the separator is disposed between the positive electrode and the negative electrode in order to prevent the electrodes from short-circuiting and allow the ions to pass through. The separator can be a glass fiber film, filter paper, polypropylene polymer film, polyethylene polymer film, or a combination thereof.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Preparation of Electrolyte Composition

Example 1

First, 8.8 g of purified ethylene glycol was added into a reaction bottle. Next, 1 g of sodium nitrate was added into the reaction bottle at room temperature under argon gas. After stirring for 6 hr, 9.8 g of clear-liquid deep eutectic electrolyte was obtained.

Example 2

First, 35.1 g of purified ethylene glycol was added into a reaction bottle. Next, 1 g of sodium nitrate was added into the reaction bottle at room temperature under argon gas. After stirring for 6 hr, 36.1 g of clear-liquid deep eutectic electrolyte was obtained.

Example 3

First, 3 g of purified ethylene glycol was added into a reaction bottle. Next, 1 g of sodium acetate was added into the reaction bottle at room temperature under argon gas. After stirring for 6 hr, 4 g of clear-liquid deep eutectic electrolyte was obtained.

Example 4

First, 9.1 g of purified ethylene glycol was added into a reaction bottle. Next, 1 g of sodium acetate was added into the reaction bottle at room temperature under argon gas. After stirring for 6 hr, 10.1 g of clear-liquid deep eutectic electrolyte was obtained.

Example 5

First, 18.2 g of purified ethylene glycol was added into a reaction bottle. Next, 1 g of sodium acetate was added into the reaction bottle at room temperature under argon gas. After stirring for 6 hr, 19.2 g of clear-liquid deep eutectic electrolyte was obtained.

Example 6

First, 8.8 g of purified triethylene glycol was added into a reaction bottle. Next, 1 g of sodium nitrate was added into the reaction bottle at room temperature under argon gas. After stirring for 6 hr, 9.8 g of clear-liquid deep eutectic electrolyte was obtained.

Example 7

First, 8.9 g of purified tetraethylene glycol was added into a reaction bottle. Next, 1 g of sodium nitrate was added into the reaction bottle at room temperature under argon gas. After stirring for 6 hr, 9.9 g of clear-liquid deep eutectic electrolyte was obtained.

Example 8

First, 4.4 g of purified ethylene glycol and 4.4 g of purified triethylene glycol were added into a reaction bottle. Next, 1 g of sodium nitrate was added into the reaction bottle at room temperature under argon gas. After stirring for 6 hr, 9.8 g of clear-liquid deep eutectic electrolyte was obtained.

Example 9

First, 4.4 g of purified ethylene glycol and 4.4 g of purified tetraethylene glycol were added into a reaction bottle. Next, 1 g of sodium nitrate was added into the reaction bottle at room temperature under argon gas. After stirring for 6 hr, 9.8 g of clear-liquid deep eutectic electrolyte was obtained.

Example 10

First, 4.4 g of purified ethylene glycol was added into a reaction bottle. Next, 1 g of sodium hexafluorophosphate was added into the reaction bottle at room temperature under argon gas. After stirring for 6 hr, 5.4 g of clear-liquid deep eutectic electrolyte was obtained.

Example 11

First, 25.5 g of purified ethylene glycol was added into a reaction bottle. Next, 1 g of sodium chloride was added into the reaction bottle at room temperature under argon gas. After stirring for 6 hr, 26.5 g of clear-liquid deep eutectic electrolyte was obtained.

Example 12

First, 18.1 g of purified ethanol was added into a reaction bottle. Next, 1 g of sodium perchlorate was added into the reaction bottle at room temperature under argon gas. After stirring for 6 hr, 19.1 g of clear-liquid deep eutectic electrolyte was obtained.

Example 13

First, 13 g of purified glycerol was added into a reaction bottle. Next, 1 g of sodium nitrate was added into the reaction bottle at room temperature under argon gas. After stirring for 6 hr, 14 g of clear-liquid deep eutectic electrolyte was obtained.

Example 14

First, 26.3 g of purified glycerol was added into a reaction bottle. Next, 1 g of sodium hydrogen carbonate was added into the reaction bottle at room temperature under argon gas. After stirring for 6 hr, 27.3 g of clear-liquid deep eutectic electrolyte was obtained.

|  | hydrogen bond donor | sodium salt | molar ratio | viscosity (cP) | ion conductivity (mS/cm) | electrochemical window (V vs. $Na^+/Na$) |
|---|---|---|---|---|---|---|
| Example 1 | ethylene glycol | sodium nitrate | 12:1 | 17.1 | 5.3 | 1.3~4.4 |
| Example 2 | ethylene glycol | sodium nitrate | 48:1 | 16.6 | 2.0 | 1.1~4.5 |
| Example 3 | ethylene glycol | sodium acetate | 4:1 | 122.5 | 1.8 | 0.8~4.4 |
| Example 4 | ethylene glycol | sodium acetate | 12:1 | 37.4 | 2.7 | 0.8~4.6 |
| Example 5 | ethylene glycol | sodium acetate | 24:1 | 28.4 | 2.0 | 1.3~4.4 |
| Example 6 | triethylene glycol | sodium nitrate | 5:1 | 46.1 | 1.0 | 0.8~6.2 |
| Example 7 | tetraethylene glycol | sodium nitrate | 3.9:1 | 54.3 | 0.8 | 0.8~6.2 |
| Example 8 | ethylene glycol + triethylene glycol | sodium nitrate | 6:2.5:1 | 21.1 | 2.9 | 0.9~5.0 |
| Example 9 | ethylene glycol + tetraethylene glycol | sodium nitrate | 6:1.9:1 | 21.3 | 2.3 | 0.9~5.0 |
| Example 10 | ethylene glycol | sodium hexafluorophosphate | 12:1 | 18.0 | 4.7 | 1.1~4.6 |
| Example 11 | ethylene glycol | sodium chloride | 24:1 | 17.7 | 3.8 | 1.4~4.1 |

As shown in Table 1, the electrolyte composition including the ethylene glycol and the sodium nitrate under the specific molar ratio exhibits superior ion conductivity and electrochemical window. The term electrochemical window refers to the voltage range which the electrolyte can tolerate without substantially reacting (i.e., undergoing reduction or oxidation) or decomposing. The various choices of the electrode can be used when the electrolyte composition has a high electrochemical window. Table 1 shows examples of the disclosure, but is not used to limit the claimed scope of the disclosure.

Preparation of Positive Electrode

Example 15

1 part by weight of sodium manganese oxide (serving as active material of positive electrode), 0.081 parts by weight of electrical conductivity enhancer (available from Timcal with a trade name of Super P), 0.081 parts by weight of a cohesive agent (polyvinylidene fluoride, PVDF) were mixed and subjected to a press forming process at 165° C., obtaining a positive electrode.

Preparation of Negative Electrode

Example 16

1 part by weight of sodium titanium phosphate (serving as negative electrode active material), 0.257 parts by weight of electrical conductivity enhancer (Super-P, K56), and 0.171 parts by weight of cohesive agent (polyvinylidene fluoride, PVDF) were mixed and dissolved in N-methyl-2-pyrrolidone (NMP). The mixture was coated on a copper foil, and thus dried at 90° C. and pressed by a rolling machine, obtaining a negative electrode.

Preparation of Battery

The positive electrode of Example 15, a separator (made of polypropylene polymer film), and the negative electrode of Example 16 were subsequently disposed into a coin-type cell (CR2032). Next, the electrolyte composition of Examples 1, 4, and 8-10 were injected into the coin-type cell individually, obtaining sodium secondary batteries. The conventional electrolyte composition ($NaPF_6$-EC/DEC) was injected into the coin-type cell, obtaining the sodium secondary batteries employing the conventional electrolyte composition.

Discharge Capacity Test

Example 17

The sodium secondary batteries were subjected to a discharge capacity test, and the results are shown in FIG. 1. The discharge capacity test included charging the battery at 100 mA/g to a voltage of 1.1V, and then discharging the battery to a voltage of 0.6V. As shown in FIG. 1, the sodium secondary battery employing the electrolyte composition of Example 1 has a great discharge capacity of 122 mAh/g. The discharge capacity of the sodium secondary battery employing the electrolyte composition of Example 1 is about 1.08 times higher than that of the sodium secondary battery employing the electrolyte composition of Example 10 (having the halogen-containing salt) due to the increase of the ion conductivity.

Example 18

Figure 2:
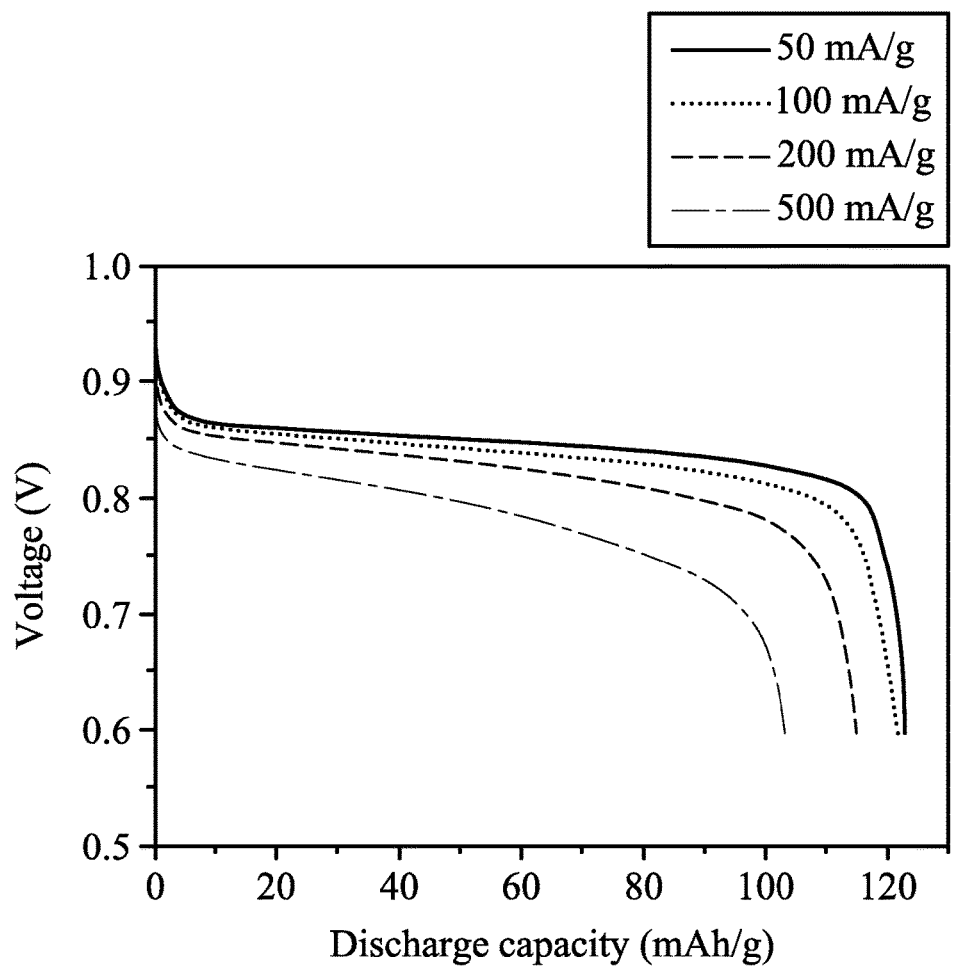
FIG. 2 shows the discharge curves of the battery employing the electrolyte composition of Example 1 at various current densities.

The sodium secondary battery employing the electrolyte composition of Example 1 was subjected to the discharge capacity test (charging the battery to a voltage of 1.1V, and then discharging the battery to a voltage of 0.6V) at 50 mA/g, 100 mA/g, 200 mA/g, and 500 mA/g, and the results are shown in FIG. 2 and Table 2. As shown in FIG. 2, the sodium secondary battery employing the electrolyte composition of Example 1 has a discharge capacity of 123 mAh/g measured at 50 mA/g, and a discharge capacity of 103 mAh/g measured at 500 mA/g. Furthermore, the sodium secondary battery employing the electrolyte composition of Example 10 was also subjected to the discharge capacity test at 50 mA/g, 100 mA/g, 200 mA/g, and 500 mA/g, and the results are shown in Table 2.

TABLE 2

| electrolyte composition | discharge capacity (mAh/g) | | | |
| --- | --- | --- | --- | --- |
| | Measured at 50 mA/g | Measured at 100 mA/g | Measured at 200 mA/g | Measured at 500 mA/g |
| Example 1 | 123 | 122 | 115 | 103 |
| Example 10 | 120 | 113 | 105 | 90 |

As shown in Table 2, the sodium secondary battery employing the electrolyte composition of Example 1 has a high discharge capacity.

Cycle Life Test

Example 19

Figure 3:
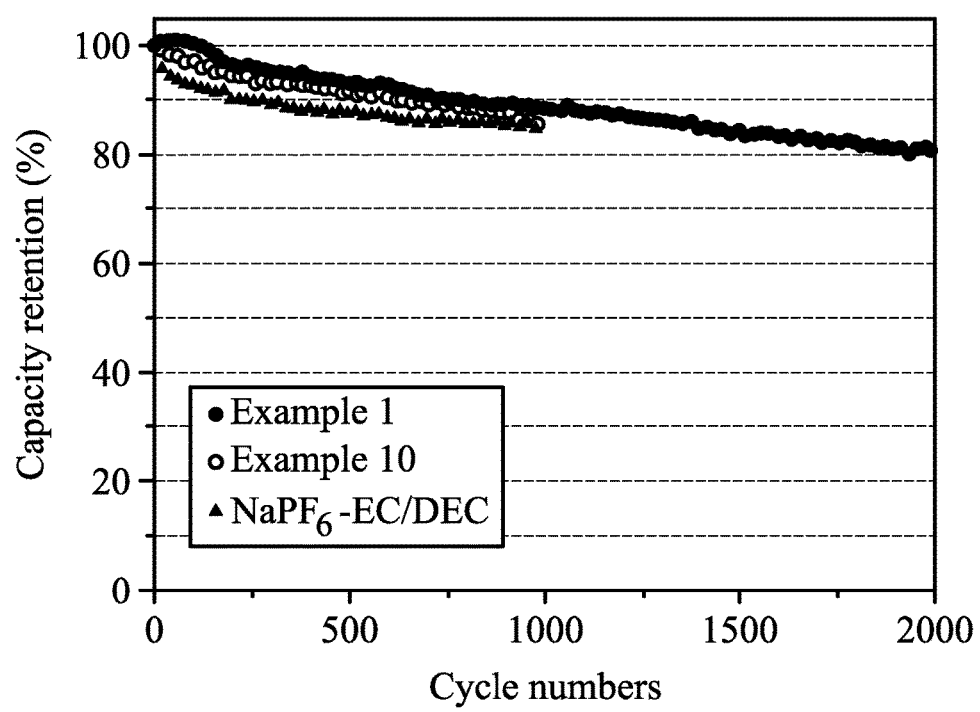
FIG. 3 shows the cycling performances of the batteries employing the electrolyte compositions of Examples 1 and 10 and the conventional electrolyte measured at 500 mA/g.

The sodium secondary batteries employing the electrolyte compositions of Examples 1 and 10, and the sodium secondary batteries employing the conventional electrolyte composition were subjected to a charge/discharge cycle test (charging the battery to a voltage of 1.1V, and then discharging the battery to a voltage of 0.6V at 500 mA/g), and the results are shown in FIG. 3 and Table 3.

TABLE 3

| electrolyte composition | capacity retention (%) | | |
| --- | --- | --- | --- |
| | 500 cycles | 1000 cycles | 2000 cycles |
| Example 1 | 93 | 89 | 81 |
| Example 10 | 92 | 87 | — |
| NaPF$_6$-EC/DEC | 88 | 85 | — |

As shown in Table 3, the sodium secondary battery employing the electrolyte compositions of Example 1 has a capacity retention of 89% after 1000 charge/discharge and has a capacity retention of 81% after 2000 charge/discharge cycles. Since the electrolyte compositions of Example 1 is without halogen-containing salt and would not produce hydrofluoric acid during use, the capacity retention of the electrolyte compositions of Example 1 is better than those of the electrolyte compositions of Example 10 and the conventional electrolyte composition.

Accordingly, the electrolyte composition of the disclosure including the alcohol compound as hydrogen bond donor and a sodium salt can serve as a deep eutectic electrolyte composition with low cost and low toxicity, and the battery employing the electrolyte composition of the disclosure has the advantages of high ion conductivity, high charge/discharge cycle life, and improved capacity retention.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A sodium secondary battery, comprising:
   a positive electrode;
   a negative electrode;
   a separator, disposed between the positive electrode and the negative electrode; and
   an electrolyte composition, wherein the electrolyte composition consists of an alcohol compound; and a metallic salt, wherein the metallic salt consists of a sodium salt, and wherein the molar ratio of the alcohol compound to the sodium salt is between 3:1 and 48:1.

2. The sodium secondary battery as claimed in claim 1, wherein the positive electrode comprises sodium-containing oxide, sodium-containing ferrocyanide, or sodium phosphate.

3. The sodium secondary battery as claimed in claim 1, wherein the negative electrode comprises metal oxide, or sodium phosphate.

4. The sodium secondary battery as claimed in claim 1, wherein the separator comprises glass fiber film, filter paper, polypropylene polymer film, polyethylene polymer film, or a combination thereof.

5. The sodium secondary battery as claimed in claim 1, wherein the alcohol compound comprises mono-alcohol, diol, triol, or a combination thereof.

6. The sodium secondary battery as claimed in claim 5, wherein the mono-alcohol comprises ethanol.

7. The sodium secondary battery as claimed in claim 5, wherein the diol comprises diethylene glycol, triethylene glycol, tetraethylene glycol, ethylene glycol, 1,3-propanediol, 1,4-butanediol, 1,5-pentanediol, or a combination thereof.

8. The sodium secondary battery as claimed in claim 5, wherein the triol comprises glycerol.

9. The sodium secondary battery as claimed in claim 1, wherein the sodium salt comprises NaPF$_6$, NaBF$_4$, NaClO$_4$, NaBr, NaCl, or a combination thereof.

10. The sodium secondary battery as claimed in claim 1, wherein the sodium salt comprises NaHCO$_3$, NaNO$_3$, CH$_3$COONa, C$_6$H$_4$(OH)COONa, or a combination thereof.

* * * * *